UNITED STATES PATENT OFFICE.

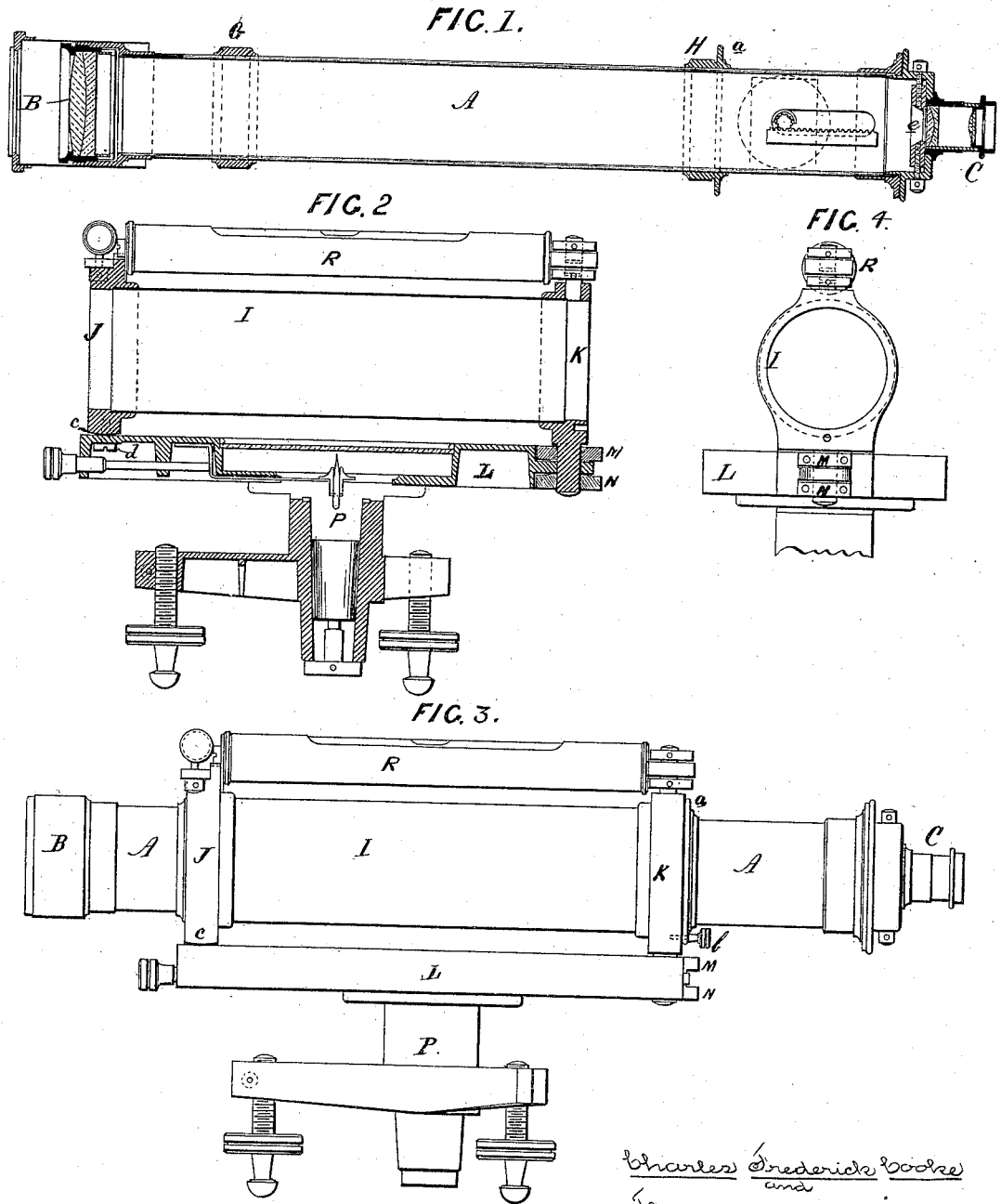

CHARLES F. COOKE AND THOMAS COOKE, OF YORK, ENGLAND.

ENGINEER'S REVERSIBLE LEVEL.

SPECIFICATION forming part of Letters Patent No. 330,210, dated November 10, 1885.

Application filed June 8, 1885. Serial No. 167,982. (No model.) Patented in England September 9, 1884, No. 12,175.

*To all whom it may concern:*

Be it known that we, CHARLES FREDERICK COOKE and THOMAS COOKE, both of the firm of THOMAS COOKE & SONS, subjects of the Queen of Great Britain, residing in York, England, have invented certain new and useful Improvements in Engineers' Reversible Levels, of which the following is a specification.

This invention has reference to what are called "engineers' reversible levels;" and the object of our improvements therein is to, first, insure a means whereby the perfect perpendicularity of the line of collimation of the telescope to the axis of the instrument may be tested or effected when in the field, if thought necessary; also, secondly, a means whereby the strength of the instrument is increased where most required; and, thirdly, efficient protection of the two collars or flanges of the telescope (to be hereinafter described) against mechanical injury, dust, and corrosion is secured.

In order that our invention may be better understood, we herein give reference to the accompanying sheet of drawings, wherein Figure 1 is a longitudinal section of the telescope. Fig. 2 is a longitudinal section of the socket, which is the most essential part of the invention. Fig. 3 is an elevation of the complete instrument, and Fig. 4 is an end elevation of the socket shown in Fig. 2.

In one end of the telescope A is fixed the object-glass B, and in the other end, C, the eyepiece, with the usual cross-lines in its focus, which are mounted on the vertically-adjustable and perforated block e. Focusing is allowed for by the object end and eye end being fixed into separate tubes which slide within one another.

On the outside of the telescope-tube are fixed the two flanges or collars G and H, which are turned to one and the same diameter, the two together forming one and the same cylindrical surface, having its axis coincident with the line of collimation of the telescope.

In Fig. 2, I is the holder or socket for the telescope, which socket is made of two collars or flanges, J and K, which are also carefully turned to one and the same diameter, the two together forming one and the same cylindrical surface, and joined rigidly together by and held at the proper distance apart by the tubing I. The diameter of these flanges and distance apart are such that they will perfectly fit over and correspond to the two flanges G and H on the telescope-tube, which flanges J and K must exceed in diameter all other parts of telescope lying between H and object end B.

It follows from the above description that the telescope-tube may be inserted object end first into either end of the socket I and pushed home until the two flanges or collars G and H are inclosed within J and K, in which case a stop-flange, *a*, on the tube abuts against one on the other end of the socket. One or more screws, *b*, passing through the flange *a* and screwing into the socket, may be provided for further securing the telescope.

One end or collar of the socket K has a screw-bolt fixed to its under side, which bolt passes through a hole in the base-plate L. Above and below the hole are the adjusting lock-nuts M and N, by means of which the end K of the socket I may be raised or lowered and then fixed. The bottom of the other end, J, of the socket is slightly rounded off, as shown at *c* in Figs. 2 and 3, and held firmly down to the base-plate L by one or more screws, *d*, passing up from the underside of L, which screws must be sufficiently flexible to allow of the slight rocking motion in the end J of the socket, which must necessarily accompany the raising or lowering of the other end, K, of the socket. The base-plate L is firmly fixed to the vertical bearing or axis P, which latter revolves in the usual three-legged socket, which is supplied with the usual three leveling foot-screws. Fixed to the top of the sockets J K is the sensitive-bubble tube R, (necessary to these instruments,) and possessing the usual means of adjustment.

In order to adjust the line of collimation of the telescope to perfect perpendicularity to the vertical axis P of the instrument, it is first of all necessary to have the cross-lines which are in the adjustable block *e* (see Fig. 1) so adjustable that the turning of the telescope one hundred and eighty degrees round its optical axis will not cause the crossing-point of the lines to move up or down in the slightest degree in relation to the image of the object toward which the telescope is directed, which image, of course, must be nicely focused onto the cross-lines in the usual manner of approaching them to or separating them from the object-glass, which latter must be nicely centered in the first place. The correct collimation of the telescope having been thus secured, the perfect perpendicularity of the line of collimation of the telescope to the vertical axis of the instrument may be brought about by first directing the telescope to a convenient test-mark, the image of which must be nicely bisected by the cross-lines. The telescope is then drawn out of its socket and pushed in again at the other end of the said socket and again directed to the test-mark, when, if the image of the test-object is no longer bisected by the cross-lines, but falls above or below them, then the socket carrying the telescope is lowered or elevated by means of the adjusting-screws M and N until the image of the test-object is exactly bisected by the cross-lines in the eye end, it being immaterial as to which end of the socket the telescope is inserted. The sensitive-bubble may be now utilized for the remaining adjustment usual with and necessary to the instruments.

In the ordinary engineer's level the telescope rests in two "Y's," so called, in which it may be axially rotated, and is kept in place by semicircular caps secured to the Y's. These Y's are not connected together, except by the base plate or "bar," and one of said Y's has a vertical adjustment similar to the adjustment at one end of our socket. In these levels the sensitive-bubble tube is mounted on the under side of the telescope itself. Our construction is intended as an improvement on this well-known construction, and it differs from the latter in the connection of the two collars rigidly by a tube, whereby they are greatly strengthened, and a lighter base-plate, L, may be employed than in the ordinary construction. At the same time the tube adds very little to the weight of the instrument. In our construction we mount the sensitive-bubble tube R on the socket, and not on the telescope, and our telescope is arranged down close to the bed-piece, which adds to its steadiness. In the ordinary construction the telescope is lifted out of its bearings. In ours it is drawn out by an endwise movement.

We claim as our invention—

1. The combination, in an engineer's level, of the base-piece, the telescope, and the elongated tubular socket, made to fit and receive the telescope and mounted at its ends upon the base-piece, and provided also with means, substantially as described, whereby one end of said socket may be adjusted vertically on the bed-piece, and clamped fast thereto when adjusted, substantially as set forth.

2. The combination, in an engineer's level, of the base-piece and the socket for the telescope, comprising two collars, J and K, rigidly connected by a tube, I, one of said collars being pivotally connected to the base-piece, and the other being adjustably connected to the base-piece by a nut and screw, whereby this end of the socket may be adjusted vertically and clamped fast, substantially as set forth.

3. The combination of the telescope provided with the base-piece L, the tubular socket for the telescope, comprising the collars J and K and the tube I, the nuts and screws for connecting the collar K to the base-piece and for effecting its vertical adjustment, and the screw d, for securing the rounded or convex base c of collar J to the base-piece, substantially as set forth.

4. The combination, with the base-piece, of the tubular socket for the telescope, constructed substantially as described, and mounted adjustably on the base-piece, and the sensitive-bubble tube R, mounted on the top of the said socket, substantially as and for the purposes set forth.

In witness whereof we have hereunto signed our names in the presence of two subscribing witnesses.

CHARLES F. COOKE.
    THOMAS COOKE.

Witnesses:
 ELLEN LAWTON,
 JANE LAWTON.